Dec. 23, 1947.  F. M. REID  2,433,158
VEHICLE BODY
Filed Jan. 10, 1945  2 Sheets-Sheet 1
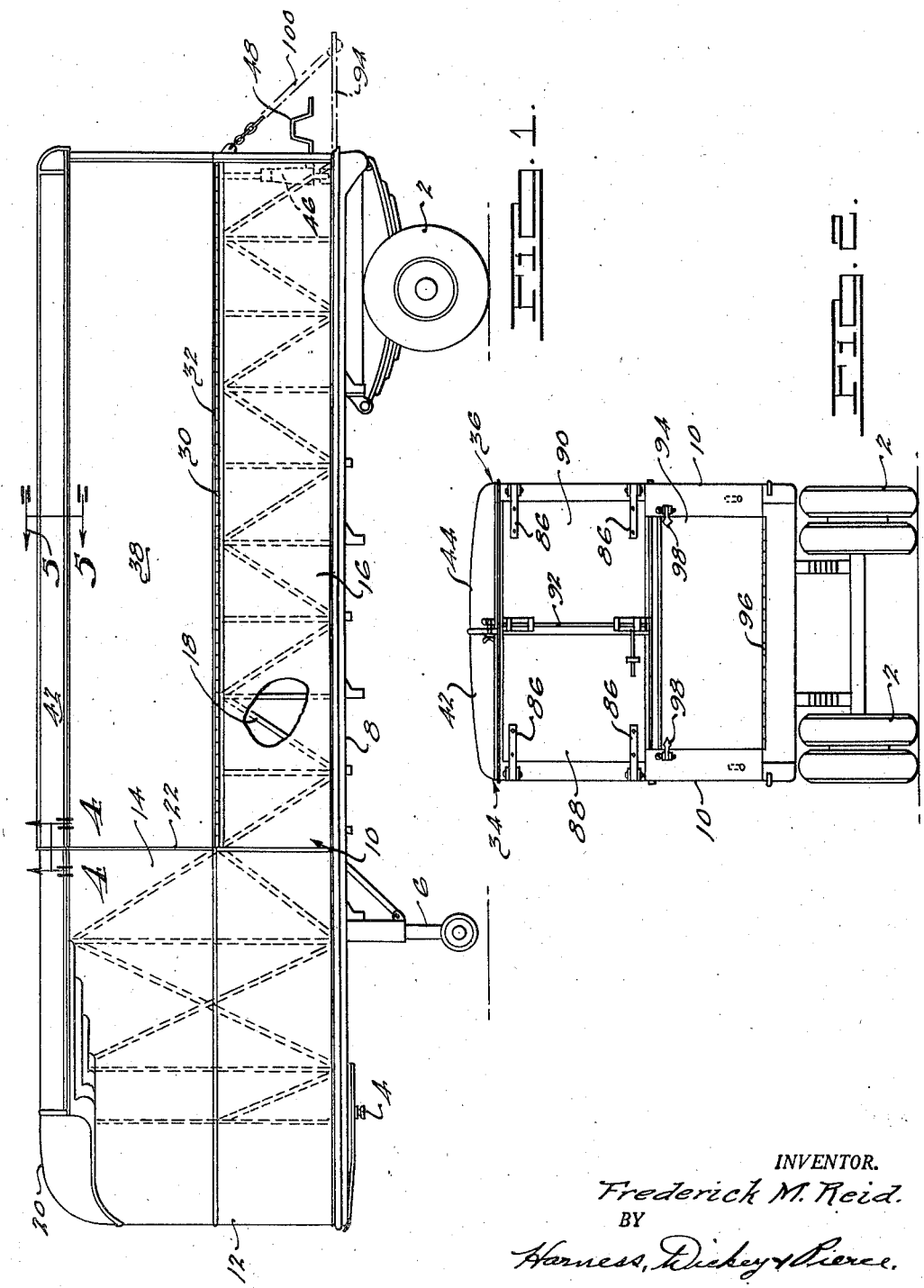
INVENTOR.
Frederick M. Reid.
BY
Harness, Dickey & Pierce.
ATTORNEYS.

Dec. 23, 1947.  F. M. REID  2,433,158
VEHICLE BODY
Filed Jan. 10, 1945  2 Sheets-Sheet 2
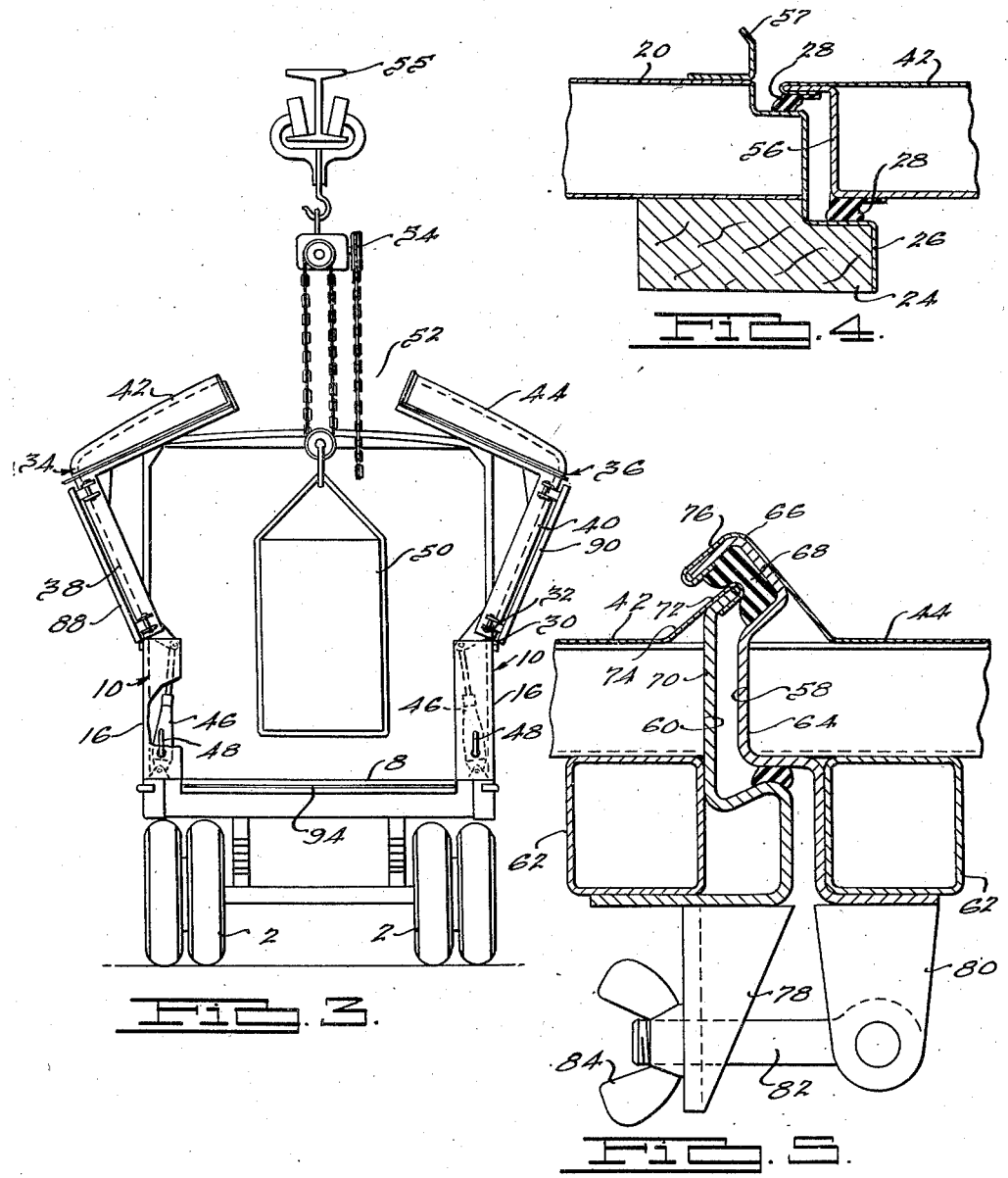
INVENTOR.
Frederick M. Reid.
BY
Harness, Dickey & Pierce.
ATTORNEYS.

Patented Dec. 23, 1947

2,433,158

UNITED STATES PATENT OFFICE 2,433,158

VEHICLE BODY

Frederick M. Reid, Detroit, Mich., assignor to Fruehauf Trailer Company, Detroit, Mich., a corporation of Michigan Application January 10, 1945, Serial No. 572,108

3 Claims. (Cl. 296—100)

This invention relates to a vehicle body either self-propelled or of the trailer type and is of primary value in handling heavy articles.

The body is of the type wherein the roof may be opened and the freight deposited by chain hoist, crane or other means and the roof may then be closed to protect the freight from the weather during transportation. Means is provided to weather-seal the roof when in closed position. The construction disclosed provides the above advantages without weakening the overall structural strength found in heavy duty vehicles. Awkward handling and shifting of heavy articles may be avoided with the consequent saving of time and effort.

These features and others will be apparent from the following specification and appended claims.

Referring to the drawings:

Fig. 1 is a side elevation of a transport embodying the invention herein;

Fig. 2 is a rear view of the vehicle of Fig. 1, with the parts thereof in closed position;

Fig. 3 is a rear view of the vehicle of Fig. 1, with the parts thereof in open position;

Fig. 4 is a view on the line 4—4, Fig. 1; and

Fig. 5 is a view on the line 5—5, Fig. 1.

While the invention herein may be readily adapted to any vehicle, the type shown is a trailer having rear wheels 2 and a fifth-wheel pintle 4 as means for fastening to a tractor for transportation. When the trailer is in storage, retractable leg mechanism 6 may be brought into use to support the forward end of the vehicle while relieving the tractor for other duties.

The body comprises floor 8 having upstanding wall or side members 10 rigidly fixed therewith. For a distance from the front end 12, the side panel portions 14 extend for the full height of the body and are rigidly and permanently secured together at their top by the roof 20, while for the remainder of the body such panels 10 have portions 16 extending upwardly only a fraction of the body height, preferably from one-third to one-half of the height of the panels 14. The upper edges of the panels 16 are not permanently fixed together. Such side walls 16 are reinforced by framework 18 of a design to impart the desired overall strength to the body. While the longitudinal extent of the rigid full height portion may vary, it has been found that where it is from one-third to one-half the full body length, ample strength to the vehicle body as a whole will result.

About the rear edge 22 of the front portion is frame member 24 mounting stepped edge plate 26. Upon one or more of the steps, weather strips 28 can be mounted (Fig. 3).

Along the upper edges 30 of the panel portions 16 are hinges 32 swingably mounting upwardly extending inverted L-shaped members 34, 36, the converging legs of which are rigidly fixed together and when closed form a continuation of the upper side portions, and the roof, of the front rigid portion. The legs 38, 40 are of sufficient height to bring the rear portion of the side walls to full height or corresponding to the height of wall portions 14, while the legs 42, 44 complete the roof. The outer edges of the legs 42, 44 abut in body-closing position but may be readily separated and swung apart by means of suitable mechanism 46. A satisfactory type of such mechanism is herein shown as a jack operable by crank 48.

As these side and roof members are swung apart or to open position, freight 50 may, if of sufficiently small dimension, be directly lowered through hatch 52 formed between the free edges of the roof sections 42, 44 when in opened position, to the floor 8 by use of material-handling equipment 54 herein shown as chain hoist. Ordinarily, however, suitable material handling apparatus, here shown as the chain hoist 54 shiftable along the I-beam support or track 55, will be employed to lift the load 50 to a height slightly above the floor 8 and, in the case shown while the I-beam is centrally aligned with the hatch 52, the chain hoist then being shifted along the I-beam 55 until the load is at the desired position longitudinally of the body and then operated to deposit the load on the floor. The chain hoist in such case passes between the free edges of the roof positions 42, 44. This avoids the necessity of trucking to a body door and having to slide or roll the freight into position. Such freight may likewise be as easily and quickly removed.

It is to be particularly noted that with this construction the free edges of the sections 42, 44 will lift a relatively small amount above the level of the fixed roof section 20 when the sections 42, 44 are swung outwardly to receive or discharge a load, thus requiring very little additional head clearance over that of a conventional, fully rigid body structure.

It being desirable the body be weatherproof throughout, means is provided not only to seal the transverse joint between the forward and rear sections but the abutting edges of the legs 42, 44. To insure a seal between the front and rear sections, the members 34, 36 have their forward edges 56 stepped complementary to plate 26 so that in closed position the plate and forward edges nest with the weatherstrip or packing 28 therebetween making a moisture, dust and temperature tight closure. This is desirable as the nature of the shipment may require protection from each. Preferably an upstanding deflector strip 57 is sealed to the rigid section of the roof immediately forwardly of its rear edge so as to intercept rain flowing rearwardly thereon and conduct it away from the joint in question.

A form of longitudinal seal is illustrated in Fig. 5. Member 44 has outer edge 58 and member 44 opposing outer edge 60. Such outer edges may be reinforced by members 62. Stepped plate 64 not only embraces outer edge 58 and its reinforcing member 62, but extends upwardly and is fabricated to form semi-inverted trough 66 mounting packing or weatherstrip 68 therein. The edge 60 of member 42 and its reinforcing member 62 are embraced by plate 70 having upper extension or fin 72 nesting in the packing 68 when the members are in closed position to effect the seal. Plate termini encasing elements 74, 76 may serve as seal trims and furthermore add strength to the construction.

Depending ears 78, 80 from the roof sections may mount locking means such as a bolt 82 extending therebetween and having nut 84 thereon by which means the two roof sections 42, 44 may be tightly drawn together and so held in an effective seal.

Mounted by hinges 86 on the rear ends of sections 42, 44 are closure members or doors 88, 90 of a height equivalent to the height of the swingable side sections and which may be locked in closed position by suitable mechanism 92. The rear end closure is completed by gate 94 of a height equivalent to the fixed side wall portions 16 and mounted on hinge 96 fixed to floor 8, and which may be locked in closed position by hasps or like means 98. When the gate is open, chain 100 maintains such in a position to serve as a continuation of floor 8.

It will be seen that the transport, due to its unique construction, may be readily opened to receive freight by gravity or rolling delivery and as readily sealed for transportation without sacrifice to body strength necessary in this type of vehicle.

The hatch need only be opened sufficiently to permit the chains or cables of the material-handling equipment to pass as the freight is swung through the rear.

What is claimed and it is desired to secure by United States Letters Patent:

1. A vehicle body having a floor, a side section rigidly fixed therewith, an L-shaped member having its pair of diverging legs fixed as to each other, a hinge connection between the side section and member whereby one leg thereof completes the vehicle side and the other forms a roof, and a crank operated jack mechanism connected between said side section and said member operable to effect hinging movement of said member relative to the side section.

2. In a vehicle body, in combination, a floor, full height side wall sections of less length than said floor fixed to corresponding longitudinal portions of said floor and at opposite sides of said body, a roof section and an end wall section rigidly fixed to said side wall sections, said roof section being of a length corresponding to the length of said side sections, a partial height side wall section rigidly fixed to said floor at each side of said body and extending from the first mentioned side wall sections to the opposite end of said body, said partial height side wall sections each being also rigidly fixed to the corresponding full height side wall sections, an additional partial height side wall section of the same length as the first mentioned partial height side wall sections mounted upon each of said first mentioned partial height side wall sections and hingedly secured thereto for movement about an axis extending longitudinally of said body, said additional partial height side wall sections each being of a height that when combined with the height of the corresponding first mentioned partial height sections they substantially equal the height of said full height side wall sections, each of said additional partial height side wall sections having a half roof section rigidly fixed thereto for pivotal movement therewith, and said half roof sections being adapted to engage each other to form a full roof portion extending between opposite sides of said body when said additional partial height side wall sections are co-planar with the corresponding full height side wall sections, and a half door hinged along one edge thereof to that end of each of said additional partial height side wall sections opposite said full height side wall sections, the free edges of said half doors adapted to be engaged with each other when said additional partial height side wall sections are in the last mentioned position thereof.

3. In a vehicle body, in combination, a floor, full height side wall sections of less length than said floor fixed to corresponding longitudinal portions of said floor and at opposite sides of said body, a roof section and an end wall section rigidly fixed to said side wall sections, said roof section being of a length corresponding to the length of said side sections, a partial height side wall section rigidly fixed to said floor at each side of said body and extending from the first mentioned side wall sections to the opposite end of said body, said partial height side wall sections each being also rigidly fixed to the corresponding full height side wall sections, an additional partial height side wall section of the same length as the first mentioned partial height side wall sections mounted upon each of said first mentioned partial height side wall sections and hingedly secured thereto for movement about an axis extending longitudinally of said body, said additional partial height side wall sections each being of a height that when combined with the height of the corresponding first mentioned partial height sections they substantially equal the height of said full height side wall sections, each of said additional partial height side wall sections having a half roof section rigidly fixed thereto for pivotal movement therewith, said half roof sections being adapted to engage each other to form a full roof portion extending between opposite sides of said body when said additional partial height side wall sections are co-planar with the corresponding full height side wall sections, a half door hinged along one edge thereto to that end of each of said additional partial height side wall sections opposite said full height side wall sections, the free edges of said half doors adapted to be engaged with each other when said additional partial height side wall sections are in the last mentioned position thereof, said half doors extending from the lower to the upper edges of said additional partial height side sections, and a tail gate hinged along one edge thereof to said floor below said doors and movable to a position to close the space between said floor and said half doors when said half doors are in closed position.

FREDERICK M. REID.

REFERENCES CITED

The following references are of record in the file of this patent:

UNITED STATES PATENTS

| Number | Name | Date |
|---|---|---|
| 822,262 | Engh | June 5, 1906 |
| 1,712,363 | Sparshatt | May 7, 1929 |
| 1,861,277 | Kjolseth | May 31, 1932 |
| 2,181,342 | Reid | Nov. 28, 1939 |
| 996,342 | Janvrin | June 27, 1911 |

FOREIGN PATENTS

| Number | Country | Date |
|---|---|---|
| 1,650 | Great Britain | July 10, 1914 |